United States Patent [19]

Allen, Jr. et al.

[11] Patent Number: 5,928,109

[45] Date of Patent: Jul. 27, 1999

[54] AUTOMATIC RANGE SHIFT FOR MULTI-SPEED TRANSMISSION

[75] Inventors: Charles E. Allen, Jr., Rochester Hills; Frank A. Palmeri, Troy; Thomas Desautels, West Bloomfield, all of Mich.; Jon M. Huber, Laurinburg, N.C.

[73] Assignee: Meritor Heavy Vehicle Systems, LLC, Troy, Mich.

[21] Appl. No.: 08/919,463

[22] Filed: Aug. 28, 1997

Related U.S. Application Data

[63] Continuation of application No. 08/507,996, Jul. 27, 1995, Pat. No. 5,676,017.

[51] Int. Cl.⁶ .......................... B60K 41/08; F16H 59/08
[52] U.S. Cl. .................... 477/111; 74/336 R; 477/908
[58] Field of Search .................... 74/336 R, 745; 477/107, 111, 908

[56] References Cited

U.S. PATENT DOCUMENTS

| | | |
|---|---|---|
| 3,171,300 | 3/1965 | Perkins et al. . |
| 3,939,722 | 2/1976 | Stromberg . |
| 4,312,248 | 1/1982 | Sugimoto et al. . |
| 4,527,447 | 7/1985 | Richards .................................. 74/331 |
| 4,593,580 | 6/1986 | Schulze . |
| 4,690,008 | 9/1987 | Klatt ..................................... 74/336 R |
| 4,722,248 | 2/1988 | Braun . |
| 4,788,875 | 12/1988 | Genise . |
| 4,944,197 | 7/1990 | Stine et al. . |
| 4,974,474 | 12/1990 | Newbigging . |
| 4,991,099 | 2/1991 | Markyvech ............................. 477/107 |
| 5,038,627 | 8/1991 | Schwaiger et al. . |
| 5,042,327 | 8/1991 | Stainton ................................ 74/336 R |
| 5,050,079 | 9/1991 | Steeby ................................... 74/336 R |
| 5,053,959 | 10/1991 | Genise ................................... 74/336 R |
| 5,053,961 | 10/1991 | Genise ................................... 74/336 R |
| 5,109,730 | 5/1992 | Zahn et al. . |
| 5,172,604 | 12/1992 | Monette et al. . |
| 5,186,066 | 2/1993 | Pankratz et al. . |
| 5,193,410 | 3/1993 | Stine et al. . |
| 5,199,312 | 4/1993 | Huggins et al. . |
| 5,199,314 | 4/1993 | Hutchison ............................. 74/336 R |
| 5,216,931 | 6/1993 | Hirsch et al. . |
| 5,218,878 | 6/1993 | Monette et al. . |
| 5,222,404 | 6/1993 | Stine . |
| 5,224,392 | 7/1993 | Hutchison et al. . |
| 5,231,895 | 8/1993 | Stine . |
| 5,263,379 | 11/1993 | Newbigging et al. . |
| 5,329,826 | 7/1994 | Graves, Jr. et al. ................. 74/336 R |
| 5,411,450 | 5/1995 | Gratton et al. . |
| 5,435,212 | 7/1995 | Menig ..................................... 74/745 |

FOREIGN PATENT DOCUMENTS

| | | |
|---|---|---|
| 0240901 | 10/1987 | European Pat. Off. . |
| 0390357 | 10/1990 | European Pat. Off. . |
| 0641958 | 3/1995 | European Pat. Off. . |

*Primary Examiner*—Dirk Wright

[57] ABSTRACT

A system for automatically effecting a range shift between high and low ranges in a multi-speed transmission includes a control that monitors the output speed of both the engine and the transmission. The ratio of the two speeds is compared to available ratios in a look-up table such that the control is constantly determining the engaged gear. In one embodiment, a driver provides an intention of the next gear to be selected to the control. Should the intended gear shift require a range shift from the engaged gear, the control actuates the range shift once the transmission has been moved to neutral. In a second embodiment, no driver intention is provided to the controller. Instead, the control compares the engine output speed to threshold values. If the threshold values predict a gear shift that would require a range shift to be effected from the currently engaged gear, then the range shift will be effected once the transmission has been moved to neutral.

14 Claims, 3 Drawing Sheets

AUTOMATIC RANGE SHIFT FOR MULTI-SPEED TRANSMISSION

This application is a continuation of the application having Ser. No. 08/507,996, which was filed on Jul. 27, 1995, now U.S. Pat. No. 5,676,017.

BACKGROUND OF THE INVENTION

This invention relates to a system for automatically shifting a multi-speed transmission between high and low ranges.

Heavy vehicles are typically equipped with a multi-speed transmission operated by a manual stick shift to achieve selected speed ratios between an engine input and the output of the transmission. In one common type of transmission, several speed ratios are provided in a main gear box. An auxiliary or range gear box is associated with the main gear box, and provides a high and low range. In one standard type of transmission the main gear box may have five speed ratios that may be selected by the operator. The auxiliary gear box has a high and a low position. The five gears in the main box provide speeds 1–5 when the range box is in low, and speeds 6–10 when the range box is in high. In this way, a relatively high number of speed ratio options are provided to the driver, without requiring as many individual gears be provided in the transmission. Aspects of the invention disclosed in this application will be explained relative to the above transmission; however, the present invention does extend to other transmission types.

Typically, the driver stick shift is provided with a switch that allows an operator to order a range shift as the operator is completing a shift (in the above example, fifth gear to sixth gear). The range shift would also be required when the operator is downshifting from sixth gear to fifth gear. While this basic system has worked well, it would be desirable to reduce the number of operations a driver must make when operating the vehicle.

As an example, when shifting a manual transmission through a change requiring a range shift, an operator of a heavy vehicle must request a range shift, actuate the clutch pedal, adjust the engine speed to match that necessary at the next gear, reactuate the clutch pedal, and move the transmission into the next gear to be engaged. This operation occurs frequently during operation of a heavy vehicle, and an operator may sometimes neglect to order the range shift when required. Moreover, the controls and necessary operations for operating a heavy vehicle have become much more complex in recent years. Thus, there is a desire to reduce the number of operations a vehicle operator must make during normal vehicle operation.

To this end, systems have been proposed that automatically change the range when a control decides that the range shift is necessary. In general, these systems have not been practical, and have not dealt with many real world variables that will be encountered in operation of the vehicle. As an example, most of these systems assume that a control will be able to store the actual currently engaged speed ratio. The logic for automatically actuating the proposed prior art range shifts is based upon the assumption that the currently engaged gear will be known and stored in a memory. The identification of the current gear is based upon remembering each gear shift. In fact, operators may manually change speeds, or may "skip shift" or shift through multiple speeds at one time. It thus becomes difficult for an engine control system to count and "remember" precisely which gear is presently engaged.

Moreover, the proposed systems rely upon complex control parameters to identify when a shift is necessary. As an example, some of the proposed systems may monitor throttle inlet, vehicle speed, and other variables that do not relate directly to when a range shift may be necessary. As such, the proposed system may not always provide accurate information, and may result in an undesired range shift, or no range shift when one should be actuated. As such, the proposed prior art systems have not achieved practically reliable automatic range shifting.

SUMMARY OF THE INVENTION

In the disclosed embodiment of this invention, an electronic control unit monitors the actual speed ratio of the transmission as the vehicle is driven. This ratio is used to determine the currently engaged gear. Thus, the electronic control unit will always "know" accurately which gear is engaged. The control unit thus accurately predicts when the transmission is in a gear that might lead to a range shift being necessary. A range shift is typically necessary during the higher gears of the low range, when it may be necessary to move the auxiliary box to the high range on an upshift. Alternatively, the range shift may also be necessary in the low gears of the high range, when it may be necessary to actuate a range shift on a downshift.

When the electronic control unit senses that the transmission is in a gear that might lead to a range shift, it monitors the output speed of the engine. This invention recognizes that the output speed of the engine is directly tied to the need for a shift that would require a range shift. As an example, in a transmission having speeds 1–5 in its low range and speeds 6–10 in its high range, should the control unit sense that the transmission is in fifth gear and further sense that the engine speed is above a certain threshold point that approaches the maximum speed for the engine, the system can identify that the next shift will most likely be an upshift to the next higher gear ratio thus requiring a range shift. Once the operator moves the transmission to neutral, the system orders a range shift to the high range. On the other hand, should the control unit determine that the transmission is in sixth gear and that the engine speed is below a certain threshold point, the control unit can predict that a downshift is next expected, and can move the transmission to the low range when the driver moves the transmission to neutral.

In a disclosed embodiment for achieving this invention, a separate solenoid valve is placed on a pressurized air line. That solenoid valve is actuated by the electronic control unit to direct pressurized air to a piston for achieving the range shift when necessary.

These and other features of the present invention can be best understood from the following specification and drawings, the following of which is a brief description.

DETAILED DESCRIPTION OF A PREFERRED EMBODIMENT

Figure 1A:
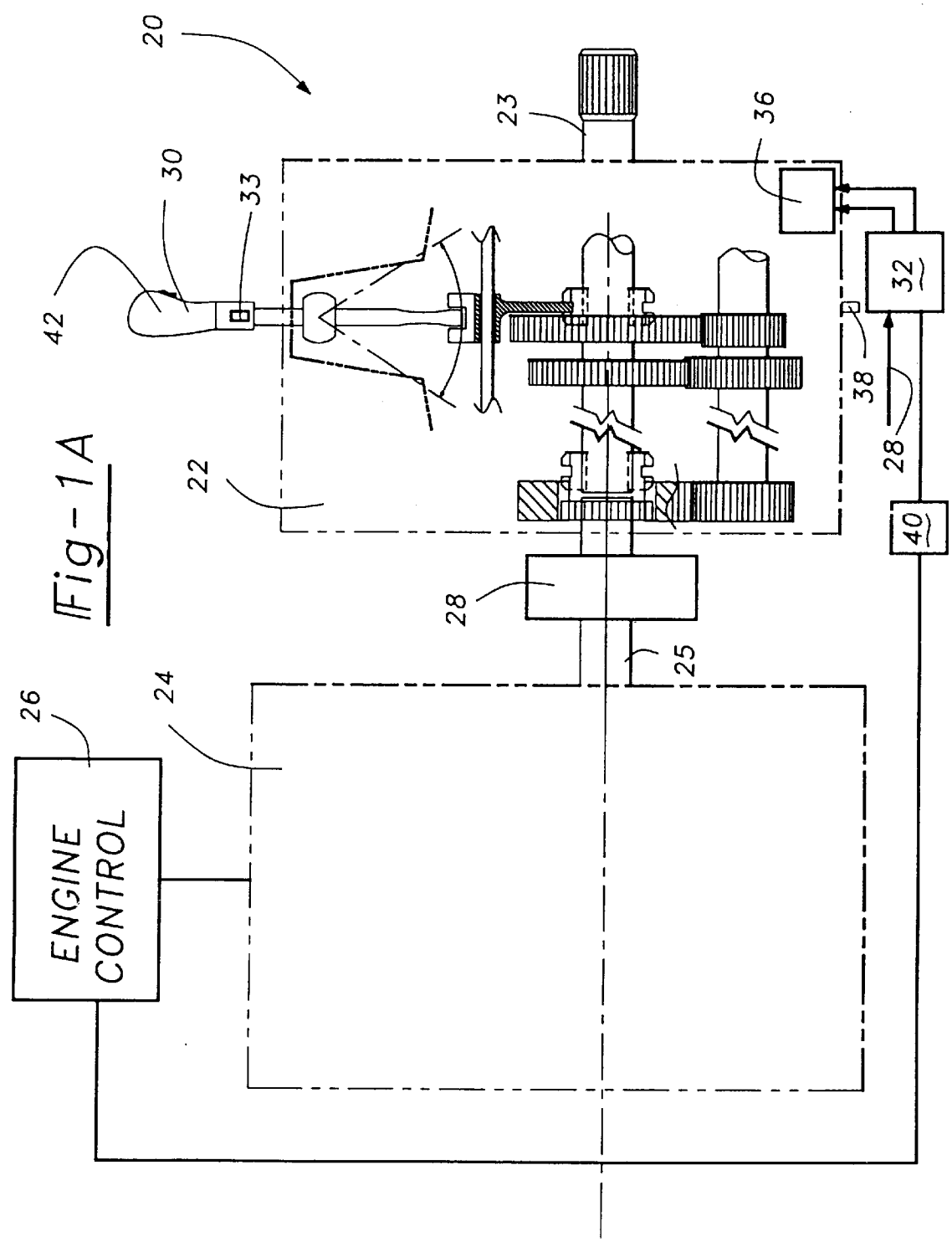
FIG. 1A is a highly schematic view of a vehicle drive.

FIG. 1A is a highly schematic view of a vehicle drive 20 incorporating a multi-speed transmission 22 having an output shaft 23. An engine 24 has an output shaft 25. The speed of output shaft 25 is controlled by an electronic control unit 26, that controls the engine speed through operation of a fuel valve, or other engine speed control parameter. A clutch 28 is positioned between the output shaft 25 and the multi-speed transmission 22. A manual transmission shift stick 30 controls the transmission 22 in a known manner. Transmission 22 is provided with a series of different gears to provide varying speed ratios between transmission output shaft 23 and the engine output shaft 25. A range control valve 32 in the prior art was actuated by a range request button 33 on the stick shift 30. Valve 32 provided pressurized air to a range shift cylinder 36, shown schematically in this Figure. As shown in greater detail in FIG. 1B, the cylinder 36 includes piston 37 driven between two reciprocating positions to move the auxiliary box between the high and low range as directed by the operator. A neutral shaft 38, shown schematically in FIG. 1A, moves relative to the transmission 22 when the transmission is in neutral. The valve 34 in the prior art would not direct pressurized fluid to cylinder piston 36 to cause a range shift unless the neutral shaft 38 provided an indication that the transmission was in neutral.

In the present invention, a valve 40, that may be a solenoid controlled value, directs pressurized fluid to move valve 32 to effect a desired range shift. Valve 40 may be controlled by a separate control, or could be controlled by the electronic control unit 26 for the engine 24.

Figure 1B:
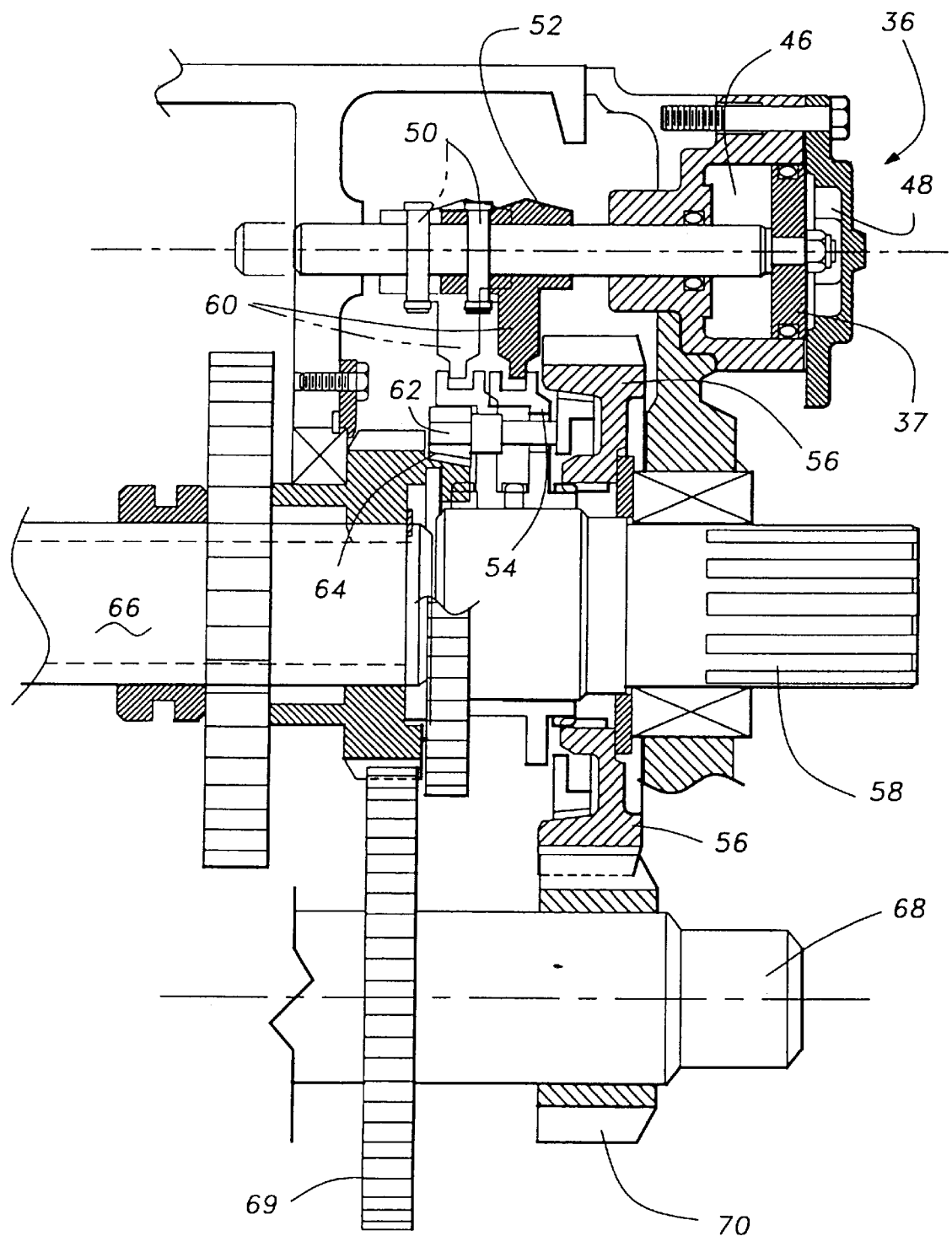
FIG. 1B is a partial view of an auxiliary gear box for a multi-speed transmission.

FIG. 1B shows the prior art structure of a known auxiliary box. Piston cylinder 36 includes a reciprocating piston 37. Fluid chambers 46 and 48 are defined on each side of piston 37. Valve 32 selectively directs fluid to one chamber 46 or 48 to move piston 37 and effect the desired range shift. In the prior art, the range switch 33 controlled the application of pressurized air to the valve 32 to move the valve 32 to a position such that it will direct pressurized air to the proper side of cylinder 36 to control the range shift. In this invention the valve 40 directs pressurized air to move the valve 32 to achieve the proper position for the desired range shift. With either system, valve 32 will not direct any pressurized air until the neutral shaft 38 indicates that transmission is in neutral. A yoke 52 is driven by a ring 50 to move a collar 54. Collar 54 is selectively engaged with either gear 56, or is moved to the position shown in phantom at 60 where the collar is engaged at 62 with a gear 64. Gear 64 is driven by shaft 66, which is directly driven by the main transmission box. Gear 64 is further engaged to drive a shaft 68 through the gear 69. Shaft 68 drives gear 70, which in turn drives gear 56.

When the collar 54 is moved to the position shown in phantom at 60, rotational drive is transmitted directly from gear 64 through shift collar 54 to the output shaft 58. When the collar is in the position shown in solid line engaged with gear 56, rotational drive is transmitted from shaft 66, through gear 64, into gear 69, from gear 70 into gear 56, and then to outlet shaft 58. In this second power train, a gear reduction is effected by the gear 69, 70 and 56, and thus a lower speed is delivered to the shaft 58. Thus, when the low range is desired, the collar is moved to the position shown in solid line, and when a high range is desired the collar is moved to the position shown in phantom. This is simply one example of a range shift as is known in the art, and this invention would extend to other types of range shift mechanisms.

Figure 2:
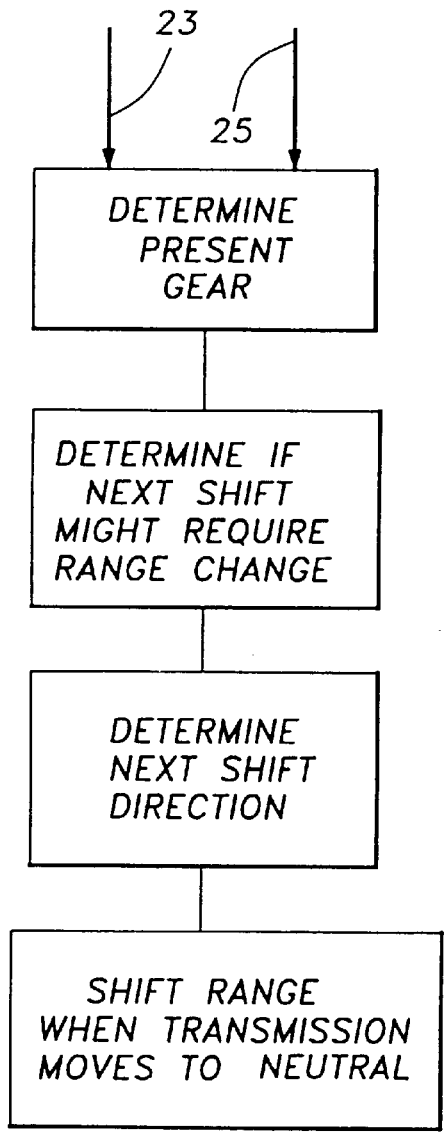
FIG. 2 is a flow chart of a method according to the present invention.

FIG. 2 shows a basic logic flow chart for effecting range shifting according to this invention. Initially, an electronic control unit determines the present gear. Most preferably, this determination is made by periodically monitoring the output speed of shaft 23 and the output speed of shaft 25. The monitored speed ratios are compared to gear ratios of the several speeds in transmission 22 by a look-up table. By comparing the actual ratios to those in the look-up table, electronic control unit 26 can determine the actual transmission speed that is presently engaged.

Once the present gear is determined, the electronic control unit 26 then determines if the present gear is one that could lead to a range shift being necessary. Again, in the example being used for this application, if the highest gear in the low range is 5, and the electronic control unit determines that the present gear is fifth gear, the electronic control unit will identify the next shift by the operator as one that would require a range shift if it is an upshift. Alternatively, if that same transmission is engaged in sixth gear, then the electronic control unit will also determine that if the next shift of the transmission is a downshift, it will require a range shift.

The electronic control unit 26 then determines if an upshift is to be expected when in the highest gear in the low range, or whether a downshift is to be expected when the lowest gear in the high range. This determination can be made in one of two ways which will be described in more detail below. In a first method, the ECU monitors engine speed and determines if that engine speed would indicate a downshift or an upshift. In an alternative embodiment, a driver intent switch 42 is actuated by the driver to provide an indication of whether an upshift or a downshift is to be the next gear shift. With either method, the ECU then waits for an indication that the transmission has been moved to neutral. Once the transmission is in neutral, the electronic control unit controls valve 40 to change the range. Although range control is disclosed as part of the ECU a separate control could also be used.

Figure 3:
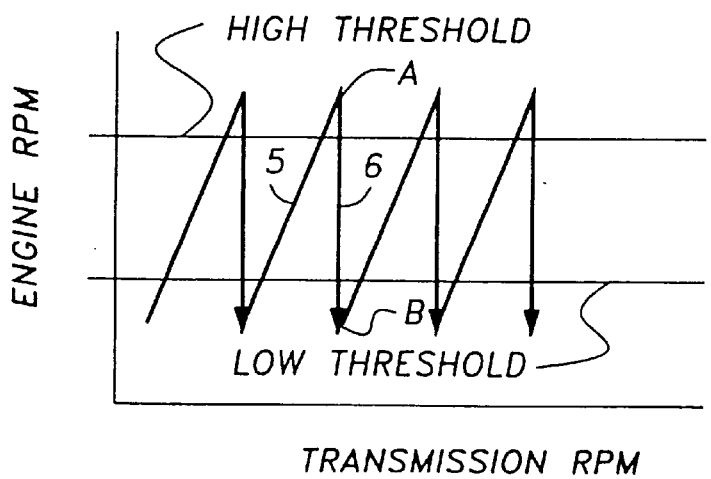
FIG. 3 is a graphic representation of some of the logic processes incorporated into this invention.

FIG. 3 is a graphic representation of a control logic utilized by this invention. This invention recognizes that the relative ratio of the transmission output speed and the engine input speed is relatively constant in any one gear. The need to upshift may be based simply upon the output of the engine, and whether it is exceeding a predetermined maximum. The need to downshift may be based by the engine running at a low speed, thus indicating that a downshift would be advisable.

As shown in FIG. 3, a chart of engine speed versus transmission speed through several speed changes has a generally saw tooth profile. The graph of the two variables in fifth gear is shown by the numeral 5 in this figure, and the graph of those same variables in sixth gear is shown by the numeral 6. High and low thresholds are also shown on this chart. As shown in FIG. 3, when in fifth gear, the operator is approaching point A. At this point, the engine speed has exceeded the high threshold. When the electronic control unit determines that the engine speed has exceeded this threshold, it will then determine that an upshift is to be expected. From the determination of the present gear, the ECU would determine an upshift would require a range shift. Based on that scenario, when the operator begins to make the next shift, the range shift will also be ordered once the electronic control unit 26 receives a signal that the transmission is in neutral.

On the other hand, when the transmission is in sixth gear and the engine speed is sensed as approaching point B, below a lower threshold, then the ECU may determine that a downshift is expected. From the determination of the present gear, the ECU determines that a downshift would also require a range shift to the low range. When the operator begins to make the next shift, the range shift will be ordered once the ECU 26 receives a signal that the transmission is in neutral.

As an alternative to this determination, a driver shift intention may be relied upon by the electronic control unit through switch 42. Any switch that may be moved between at least two positions to provide the upshift and downshift signals may be utilized. Switch 42 allows a driver to indicate a shift intent as part of an overall control for assisting a driver in shifting the transmission. The system allows the operator to shift without clutching or manually synchronizing the input speed of the engine to the output speed of the transmission at the new gear. Instead, ECU 26 reduces the torque transmission through the connection of the engine to the transmission to allow the operator to move the transmission out of neutral without clutching. The speed of the engine shaft 25 is then synchronized to achieve the speed ratio at the next gear. The electronic control unit determines what the next gear will be based upon the shift intent from the operator 42.

The details of the above-described engine control systems are disclosed in co-pending, U.S. patent applications Ser. No. 08/508,135, entitled "Engine Speed Synchronization System for Assisting a Manual Transmission Shift;" Ser. No. 08/508,155, entitled "Method and Apparatus for Assisting and Shifting Transmission to Neutral;" Ser. No. 08/508,153, entitled "Four-Position Switch for Shift Assist System;" Ser. No. 08/508,067, entitled "Two-Position Neutral Switch for Multi-Speed Transmission;" Ser. No. 08/508,307, entitled "Operator Input System for Gear Shift Assist Mechanism;" Ser. No. 08/508,111, entitled "Engine Speed Retardation for Transmission Upshifts;" and Ser. No. 08/508,156, entitled "Combined System for Assisting Shifting of Manual Transmission Without Clutching." The above applications were all filed on the same date as this application.

A preferred embodiment of this invention has been disclosed, however, a worker of ordinary skill in the art would recognize that certain modifications would come within the scope of this invention. For that reason, the following claims should be studied to determine the true scope and content of this invention.

We claim:

1. A method of controlling a vehicle transmission having a main gear box driven by an engine and an auxiliary gear box that provides more than one range of available gear ratios within the transmission, comprising the steps of:

(A) determining that a range shift within the auxiliary gear box is necessary to move the transmission into the next desired gear ratio;

(B) manually shifting the transmission into neutral;

(C) automatically effecting a shift within the auxiliary gear box after completing step (B);

(D) automatically causing a speed of an output shaft on the engine to be a speed that is synchronized with a speed of the transmission at the next desired gear ratio; and (E) manually shifting the transmission into the next desired gear ratio.

2. The method of claim 1, wherein step (A) is performed by the substeps of determining a currently engaged gear ratio within the transmission and determining whether the currently engaged gear ratio is adjacent a gear ratio that requires a range shift within the auxiliary gear box to effect a shift from the currently engaged gear ratio.

3. The method of claim 2, wherein step (A) is performed by the further substeps of monitoring a speed of the engine output shaft and a speed of an output shaft on the transmission and comparing the engine output shaft speed and the transmission output shaft speed to thereby determine the currently engaged gear ratio.

4. The method of claim 2, wherein step (A) is performed by the further substeps of monitoring a speed of the engine output shaft and comparing the speed to a threshold value and determining that a range shift is necessary when the engine output shaft speed is beyond the threshold value.

5. The method of claim 4, wherein the currently engaged gear is at a low end of one of the ranges and step (A) is performed by comparing the engine output shaft speed to a minimum threshold value and when the speed is below the minimum value, determining that a range shift is required to effect a downshift of the transmission.

6. The method of claim 4, wherein the currently engaged gear is at a high end of one of the ranges and step (A) is performed by comparing the engine output shaft speed to a maximum threshold value and when the speed is above the maximum value, determining that a range shift is required to effect an upshift of the transmission.

7. The method of claim 1, wherein step (A) is performed by an operator of the vehicle causing a shift intent signal to be generated and determining that a range shift is necessary when a currently engaged gear ratio is at one end of one of the ranges and the shift intent signal indicates a desire to shift the transmission into an adjacent gear in the other range.

8. A method of controlling a vehicle transmission having a main gear box with a plurality of available gear ratios, an engine that drives the transmission, an auxiliary gear box that is associated with the main gear box to provide more than one range of available gear ratios and an electronic controller, comprising the steps of:

(A) determining that a range shift will be necessary to complete a shift into a next desired gear ratio;

(B) automatically controlling the engine speed, using the electronic controller, to allow a vehicle operator to manually move the transmission out of the currently engaged gear ratio;

(C) determining that the transmission has been manually moved into neutral;

(D) automatically effecting a range shift within the auxiliary gear box after performing step (D); and (F) automatically controlling the engine speed, using the electronic controller, to synchronize the engine speed with a speed associated with the next desired gear ratio.

9. The method of claim 8, wherein step (A) is performed by the substeps of determining a currently engaged gear ratio within the transmission and determining whether the currently engaged gear ratio is adjacent a gear ratio that requires a range shift within the auxiliary gear box to effect a desired shift from the currently engaged gear ratio.

10. The method of claim 9, wherein step (A) is performed by the further substeps of monitoring a speed of the engine output shaft and a speed of an output shaft on the transmission and comparing the engine output shaft speed and the transmission output shaft speed to thereby determine the currently engaged gear ratio.

11. The method of claim 9, wherein step (A) is performed by the further substeps of monitoring a speed of the engine output shaft and comparing the speed to a threshold value and determining that a range shift is necessary when the engine output shaft speed is beyond the threshold value.

12. The method of claim 11, wherein the currently engaged gear is at a low end of one of the ranges and step (A) is performed by comparing the engine output shaft speed to a minimum threshold value and when the speed is below the minimum value, determining that a range shift is required to effect a downshift of the transmission.

13. The method of claim 11, wherein the currently engaged gear is at a high end of one of the ranges and step (A) is performed by comparing the engine output shaft speed to a maximum threshold value and when the speed is above the maximum value, determining that a range shift is required to effect an upshift of the transmission.

14. The method of claim 8, wherein step (A) is performed by an operator of the vehicle causing a shift intent signal to be generated and determining that a range shift is necessary when a currently engaged gear ratio is at one end of one of the ranges and the shift intent signal indicates a desire to shift the transmission into an adjacent gear that is in the other range.

* * * * *